United States Patent
Dean et al.

(10) Patent No.: US 6,805,956 B2
(45) Date of Patent: Oct. 19, 2004

(54) PROCESS FOR COATING A WIRE OR CABLE WITH POLYPHENYLENE SULFIDE ALLOY AND RESULTING COATED WIRE

(75) Inventors: David M. Dean, West Chester, PA (US); Richard James Arhart, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/201,053

(22) Filed: Jul. 23, 2002

(65) Prior Publication Data

US 2003/0111254 A1 Jun. 19, 2003

Related U.S. Application Data

(63) Continuation-in-part of application No. 09/916,839, filed on Jul. 27, 2001, now Pat. No. 6,645,623, which is a continuation-in-part of application No. 09/620,149, filed on Jul. 20, 2000, now Pat. No. 6,608,136.

(51) Int. Cl.[7] ............................. D02G 3/00; B05D 5/12
(52) U.S. Cl. ....................... 428/379; 428/375; 428/391; 174/110 SR; 427/118
(58) Field of Search ................................. 428/391, 375, 428/379; 427/118; 174/110 SR

(56) References Cited

U.S. PATENT DOCUMENTS

| | | |
|---|---|---|
| 3,264,272 A | 8/1966 | Rees |
| 3,355,319 A | 11/1967 | Rees |
| 3,404,134 A | 10/1968 | Rees |
| 4,321,337 A | 3/1982 | Smith |
| 4,871,810 A | 10/1989 | Saltman |
| 5,625,002 A | 4/1997 | Kadoi et al. |
| 5,654,358 A | 8/1997 | Kadoi et al. |

FOREIGN PATENT DOCUMENTS

| | | |
|---|---|---|
| EP | 0 406 553 A2 | 1/1991 |
| WO | WO 93/08234 | 4/1993 |
| WO | WO 98/58019 | 12/1998 |
| WO | WO 01/08165 A1 | 2/2001 |

OTHER PUBLICATIONS

Darryl R. Fahey and Jon F. Geibel, Poly(Phenylene Sulfide) (Synthesis by p–Dicholorobenzene and Sodium Sulfide), Polymeric Materials Encyclopedia, p. 6510, vol. 8, ed. J. C. Salamone.

*Primary Examiner*—Cynthia H. Kelly
*Assistant Examiner*—J. Gray

(57) ABSTRACT

The present invention relates a process for manufacturing polymer coated wire and cable and an electrically conductive wire having a metal core and an outer electrically-insulative, polymer coating capable of withstanding temperatures as high as 150° C., wherein the polymer composition contains polyphenylene sulfide, a polymeric grafting agent and an ethylene copolymer. The polymeric grafting agent is a copolymer of at least about 50% by weight ethylene, about 0.5% to about 15% by weight of a reactive comonomer (e.g. unsaturated epoxide of 4–11 carbon atoms) and the ethylene copolymer comprises at least about 50% by weight ethylene and about 1% to about 35% by weight of an acid-containing unsaturated mono-carboxylic acid comonomer. The molar ratio of the reactive comonomer in the polymeric grafting agent to the unsaturated mono-carboxylic acid comonomer of the ethylene copolymer is to be maintained between 1.0 and 5.5 in order to achieve the desired polyphenylene sulfide wire coating properties.

18 Claims, 1 Drawing Sheet

PROCESS FOR COATING A WIRE OR CABLE WITH POLYPHENYLENE SULFIDE ALLOY AND RESULTING COATED WIRE

CROSS-REFERENCE TO RELATED APPLICATIONS

This is a continuation-in-part of U.S. application Ser. No. 09/620,149 filed Jul. 20, 2000, now issued as U.S. Pat. No. 6,608,136, and a continuation-in-part of U.S. application Ser. No. 09/916,839 filed Jul. 27, 2001, now issued as U.S. Pat. No. 6,645,623, both herein incorporated by reference.

BACKGROUND OF THE INVENTION

1. Field of the Invention

The present invention relates to the use of thermoplastic polymer alloy compositions in wire and cable coating applications. More specifically but not by way of limitation, the invention relates to the manufacture of polyphenylene sulfide (PPS) coated wire capable of withstanding high temperatures.

2. Description of Related Art

Temperature requirements for the insulation materials of wire and cable used under the hood of today's high performance cars continue to increase. Thermoplastic polyvinyl chloride (PVC) used in high volume in automotive wiring provides chemical and flame resistance, insulation capability, and reasonable toughness, but suffers from higher temperature capability and environmental concern. The difficulties of disposal and recycle of PVC resin are recognized as serious problems today. Incineration results in formation of significant quantities of hydrogen chloride and heavy metal residues. Additionally, PVC is not compatible with other plastics used in manufacture of automobiles, which creates problems during recycling operations.

Today's automotive wiring requires high temperature capability, good chemical and flame resistance, good electrical properties, good low temperature flexibility, and toughness. WO 93/08234 (Hausmann), published Apr. 29, 1993, provides a partially grafted, flexible thermoplastic blend based on polyester thermoplastic, epoxy group-containing ethylene copolymer, and ionomer of an acid group-containing ethylene copolymer with high and low temperature capability but poor flame resistance. Addition of halogen can provide flame resistance but introduces the environmental issue described above.

Crosslinked ethylene vinyl acetate copolymers (EVA) filled with hydrated fillers provide flame retardancy without halogen but modest mechanical toughness precludes thin automotive coatings for space savings in today's tightly configured engine compartments. Crosslinking by either peroxide or irradiation adds cost. In the case of peroxide crosslinking, capital equipment such as a continuous vulcanization (CV) tube is required in contrast to thermoplastic systems.

Polyphenylene sulfide (PPS) is a high temperature, semicrystalline, engineering thermoplastic with excellent chemical resistance, high heat deflection temperature, good electrical insulation properties, and inherent flame resistance without halogen. Its poor flexibility can be seen in low impact strength and low elongation at break. Thus, PPS use has been limited in wire and cable applications that require high temperature capability, impact resistance, and flexibility, such as wiring under the hood of automobiles, certain home appliances and related high temperature applications.

Toughened alloy compositions formed by melt blending certain ethylene copolymers, certain polymeric grafting agents which contain reactive groups selected from at least one of epoxides, isocyanates, aziridine, silanes, alkyl halides, alpha-halo ketones, alpha-halo aldehydes, or oxazoline, along with a polymer selected from polyethylene, polypropylene and copolymer thereof, poly(butene-1), poly-4-methylpent-1-ene, polystyrene and copolymers thereof, polyphenylene oxide, polyphenylene sulfide (PPS) and polysulfone, are taught under U.S. Pat. No. 4,871,810 (Saltman).

Higher modulus alloys compositions containing PPS are disclosed in U.S. Pat. Nos. 5,625,002 and 5,654,358 (Toray). Neither Saltman nor Toray address suitable polyphenylene sulfide alloy compositions for flexible, high temperature, flame retardant applications such as wire and cable.

Consequently, there is a need in the art for a flexible, tough thermoplastic composition with low and high temperature capability, good electricals, and flame retardancy, preferably without halogen, for use in wire and cable applications, particularly automotive, under-the-hood wiring and home appliances.

BRIEF SUMMARY OF THE INVENTION

The present invention provides a process for coating a wire or cable with a polymer composition comprising the steps of:

(I) heating the polymer composition to form a polymer melt; and (II) extruding the polymer melt around a wire or cable to form a coated wire or cable, wherein the polymer composition comprises:

(a) from 40% to 90% by weight polyphenylene sulfide;

(b) from 9% to 50% by weight of a polymeric grafting agent, said grafting agent comprising a copolymer wherein for every one hundred parts by weight copolymer (i) at least 50 parts by weight are derived from ethylene comonomer; (ii) from 0.5 to 15 parts by weight are derived from one or more reactive comonomer selected from the group consisting of an unsaturated epoxide of 4 to 11 carbon atoms; an unsaturated isocyanate of 2 to 11 carbon atoms; an unsaturated alkoxy silane and unsaturated alkyl silane, wherein the alkoxy and the alkyl group is from 1 to 12 carbon atoms; and an unsaturated oxazoline; and (iii) from 0 to 49 parts by weight are derived from an optional third comonomer selected from the group consisting of an alkyl acrylate, alkyl methacrylate, vinyl ether, carbon monoxide, and sulfur dioxide, where the alkyl and ether groups are of 1 to 12 carbon atoms; and (c) from 1% to 20% by weight of an ethylene copolymer, wherein for every one hundred parts by weight ethylene copolymer (i) at least 50 parts by weight are derived from ethylene comonomer, (ii) from 1 to 35 parts by weight are derived from an acid-containing unsaturated carboxylic acid or anhydride comonomer, and (iii) from 0 to 49 parts by weight are derived from a comonomer selected from the group consisting of alkyl acrylate, alkyl methacrylate, vinyl ether, carbon monoxide, and sulfur dioxide, and further wherein the acid groups are neutralized from 0 to 100% by a metal ion.

The present invention further provides an electrically conductive wire comprising a metal core and an outer electrically insulating, polymer coating; wherein the polymer coating comprises:

(a) from 40% to 90% by weight polyphenylene sulfide;

(b) from 9% to 50% by weight of a polymeric grafting agent, the grafting agent comprising a copolymer wherein for every one hundred parts by weight copolymer (i) at least 50 parts by weight are derived from ethylene comonomer; (ii) from 0.5 to 15 parts by weight are derived from one or more reactive comonomer selected from the group consisting of an unsaturated epoxide of 4 to 11 carbon atoms; an unsaturated isocyanate of 2 to 11 carbon atoms; an unsaturated alkoxy silane and/or unsaturated alkyl silane, wherein the alkoxy and the alkyl group is from 1 to 12 carbon atoms; and an unsaturated oxazoline; and (iii) from 0 to 49 parts by weight are derived an optional third comonomer selected from the group consisting of an alkyl acrylate, alkyl methacrylate, vinyl ether, carbon monoxide, and sulfur dioxide, where the alkyl and ether groups are of 1 to 12 carbon atoms; and (c) from 1% to 20% by weight of an ethylene copolymer, wherein for every one hundred parts by weight ethylene copolymer (i) at least 50 parts by weight are derived from ethylene comonomer, (ii) from 1 to 35 parts by weight are derived from an acid-containing unsaturated carboxylic acid or anhydride comonomer, and (iii) from 0 to 49 parts by weight are derived from a comonomer selected from the group consisting of alkyl acrylate, alkyl methacrylate, vinyl ether, carbon monoxide, and sulfur dioxide, and further wherein the acid groups are neutralized from 0 to 100% by a metal ion, wherein the wire withstands temperatures as high as 150° C.

For purposes of the present invention the phrase "partially grafted" means that the ethylene copolymer (c) is the limiting component so that the grafting reaction between the polymer grafting agent (b) and the ethylene copolymer (c) is limited by the amount of acid functionality of the ethylene copolymer, i.e. the use of more ethylene copolymer than is permitted by claims herein would result in an increased level of crosslinking between components which would adversely affect the beneficial properties of this invention.

In this disclosure, the word "copolymer" means a polymer polymerized from two or more monomers, and includes terpolymers. The more specific description 'ethylene acrylic acid copolymer', 'ethylene methacrylic acid copolymer', and the like, is meant to include copolymers which may also have a third monomer present.

Ethylene/acid copolymers, i.e. "acid copolymers" and their corresponding ionomers are well known in the art to be copolymers of ethylene with an olefinically unsaturated organic mono- or di-acid such as acrylic or methacrylic acid, or maleic acid or fumaric acid or their anhydrides, the acid (or anhydride) comprising about 0.5 to 50 mole percent of the total polymeric material. The ethylene/acid copolymers and their methods of preparation are well known in the art and are disclosed in, for example, U.S. Pat. Nos. 3,264,272; 3,404,134; 3,355,319 and 4,321,337. The copolymers are termed ionomers when the acid is neutralized in whole or in part to produce a salt. The cations for the salts are usually an alkali metal such as sodium, potassium, zinc or the like. "Acid copolymers" or "ionomers" referred to herein may be direct copolymers or graft copolymers.

Ethylene/acid/acrylate terpolymer and corresponding ionomers are well known in the art to be copolymers of ethylene, an olefinically unsaturated organic acid such as acrylic or methacrylic acid and an alkyl acrylate or methacrylate termonomer (e.g. n-butyl acrylate or methacrylate or isobutylacrylate).

DETAILED DESCRIPTION OF THE INVENTION

Figure 1:
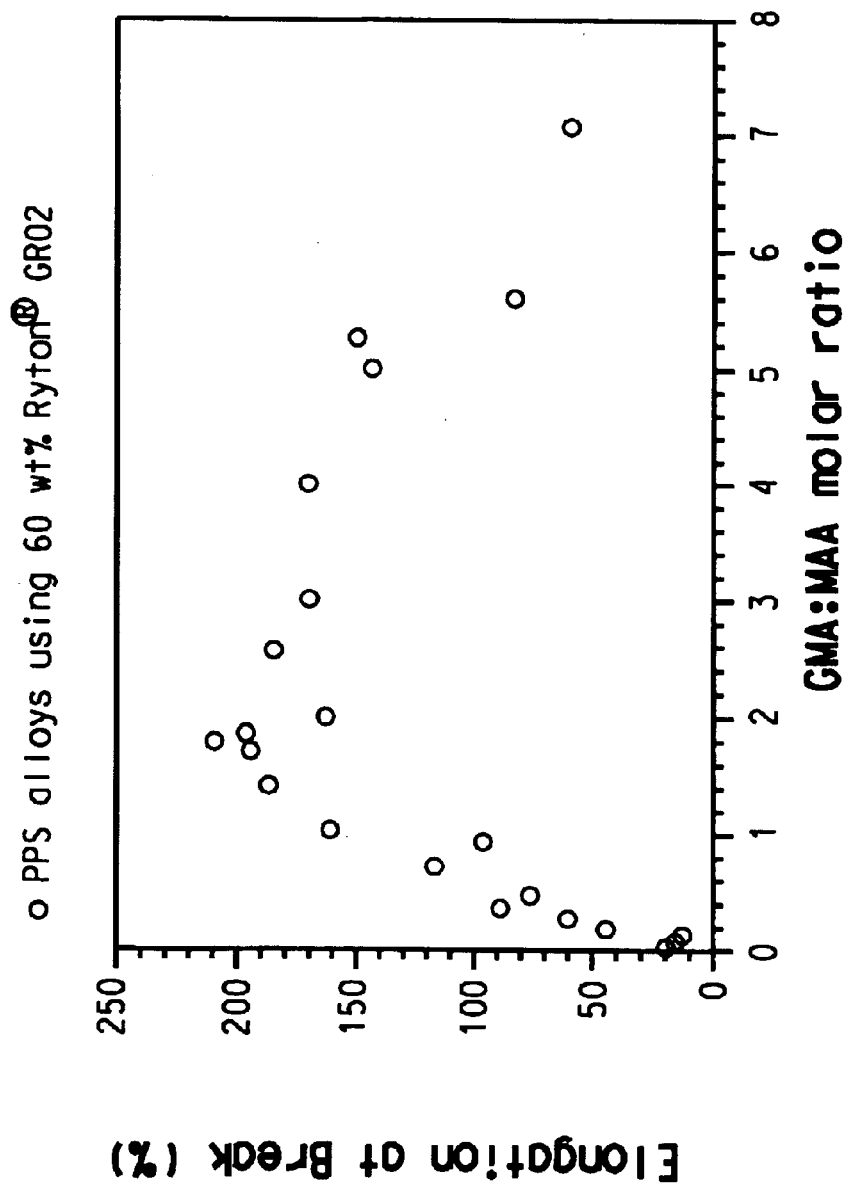
FIG. 1 is a chart depicting elongation at break v. GMA:MAA (i.e., glycidyl methacrylate/methacrylic acid) molar ratio for Examples 1, and 3–14.

This invention provides a process for manufacture of an electrically conductive wire coated with thermoplastic alloys based on polyphenylene sulfide (PPS), that is generally useful in high temperature applications such as home appliances and specifically useful in the manufacture of ultra thin automotive wire meeting J1678 specifications by Society of Automotive Engineers, Inc., herein incorporated by reference. As such, this application in the process of claiming the wire also discloses both compositions as well as wire and cable coatings. The compositions are partially grafted, flexible, non-halogen containing, thermoplastic alloys. These PPS alloys have excellent mechanical, low and high temperature capability, and chemical and flame resistance for use in demanding automotive, under-the-hood wiring applications and certain home appliance applications. These coatings show minimal discoloration and a retention of properties after aging 21 days at 150° C., e.g., at least 50% of elongation at break is retained, though this result is dependent on the amount and type of stabilizer incorporated into the alloy.

This invention discloses both a composition and a wire and cable coating comprising about 40% to about 90% by weight polyphenylene sulfide. Polyphenylene sulfide (PPS) is known in the art, and has been reported to be relatively inactive. See, e.g., U.S. Pat. No. 5,625,002, col. 1. It has been suggested in the literature, however, that PPS may contain reactive end-groups such as —$C_6H_4Cl$ and —$C_6H_4S^-Na^+$ (or $C_6H_4SH$ if the reaction mixture is acidified). See Darryl R. Fahey and Jon F. Geibel, "Poly (Phenylene Sulfide) (Synthesis by p-Dicholorobenzene and Sodium Sulfide)" in Polymeric Materials Encyclopedia, ed. J. C. Salamone, vol. 8, p. 6510. These end-groups, when present, should have a beneficial effect on the properties of the compositions described by this invention as additional grafting between the polymeric grafting agent (b) and the continues phase of PPS (a) would be possible. In fact, if the number of reactive end-groups present in the PPS used for this invention can be increased, it should be possible to further enhance the beneficial properties provided by the compositions outlined in this invention. Additionally, by altering the end-group chemistry of PPS to enhance groups capable of reaction with grafting agent (b), it may be possible to alter the optimum ratios of grafting agent (b) to ethylene copolymer (c) described by this invention.

The PPS base thermoplastic resin (a) useful in this invention has a high melting point (e.g., 265° C. melting onset) and is a substantially linear polymer having a relatively high molecular weight. Such resins are available commercially. A preferred PPS resin is Ryton GR02, a high flow/low viscosity grade from Phillips Petroleum. The compositions of the instant invention preferably contain about 50% to about 70% by weight PPS, most preferably about 60% by weight. Compositions with PPS greater than 90 wt % are generally too stiff and lack elongation to be attractive for automotive under the hood wiring. Compositions with PPS less than 40 wt % generally do not involve the PPS as the continuous phase (i.e., the ethylene copolymer generally becomes the continuous phase).

The composition and wire and cable coating also comprises about 10% to about 50% by weight of a polymeric grafting agent, preferably about 20% to about 40%, and most preferably about 30% to about 37% by weight, with a suggested optimum of about 33% by weight, depending upon the nature and content of other components.

Polymeric grafting agents (b) useful in the compositions of the invention are ethylene copolymers copolymerized with one or more reactive groups selected from unsaturated epoxides of 4 to 11 carbon atoms, such as glycidyl acrylate, glycidyl methacrylate (GMA), allyl glycidyl ether, vinyl glycidyl ether, and glycidyl itaconate, unsaturated isocyanates of 2 to 11 carbon atoms, such as vinyl isocyanate and isocyanato-ethyl methylacrylate, as well as unsaturated aziridines, silanes, or oxazolines and may additionally contain a second moiety such as alkyl acrylate, alkyl methacrylate, carbon monoxide, sulfur dioxide and/or vinyl ether, where the alkyl radical is from 1 to 12 carbon atoms.

In particular, the polymeric grafting agent is a copolymer of at least 50% by weight ethylene, 0.5 to 15% by weight of at least one reactive moiety selected from the group consisting of (i) an unsaturated epoxide of 4 to 11 carbon atoms, (ii) an unsaturated isocyanate of 2 to 11 carbon atoms, (iii) an unsaturated alkoxy or alkyl silane wherein the alkyl group is from 1 to 12 carbon atoms, and (iv) an unsaturated oxazoline, and 0 to 49% by weight of a second moiety selected from at least one of an alkyl acrylate, alkyl methacrylate, vinyl ether, carbon monoxide, and sulfur dioxide, where the alkyl and ether groups above are 1 to 12 carbon atoms.

Preferred polymeric grafting agents for use in the compositions of the present invention include ethylene/glycidyl acrylate, ethylene/n-butyl acrylate/glycidyl acrylate, ethylene/methylacrylate/glycidyl acrylate, ethylene/glycidyl methacrylate (E/GMA), ethylene/n-butyl acrylate/glycidyl methacrylate (E/nBA/GMA) and ethylene/methylacrylate/glycidyl methacrylate copolymers. The most preferred grafting agents for use in the compositions of the present invention are copolymers derived from ethylene/n-butyl acrylate/glycidyl methacrylate and ethylene/glycidyl methacrylate.

A particularly preferred polymeric grafting agent is a copolymer of at least 55% by weight ethylene, 1 to 10% by weight of an unsaturated epoxide of 4 to 11 carbon atoms, and 0 to 35% by weight of at least one alkyl acrylate, alkyl methacrylate, or mixtures thereof where the alkyl groups contain 1 to 8 carbon atoms. Preferred unsaturated epoxides are glycidyl methacrylate and glycidyl acrylate, which are present in the copolymer at a level of 1 to 7% by weight. Preferably, ethylene content is greater than 60% by weight and the third moiety is selected from methyl acrylate, iso-butyl acrylate, and n-butyl acrylate.

The compositions and wire and cable coatings also comprise about 1% to about 20% by weight of an ethylene copolymer, preferably about 5% to about 15% by weight, more preferably about 7% by weight. Ethylene copolymers (c) useful in the present invention comprise at least 50% by weight of ethylene, 1 to 35% by weight of an acid-containing unsaturated carboxylic acid, acid anhydride or derivatives thereof, and 0 to 49% by weight of a moiety selected from at least one of alkyl acrylate, alkyl methacrylate, vinyl ether, carbon monoxide, and sulfur dioxide, and further wherein the acid groups are neutralized from 0 to 100% by a metal ion.

Preferred ethylene copolymers comprise at least 60% by weight of ethylene, 5 to 15% by weight of acrylic acid or methacrylic acid, and 0 to 25% by weight of a moiety selected from at least one of methyl acrylate, iso-butyl acrylate, and n-butyl acrylate, and further wherein the acid groups are neutralized from 0 to 70%, preferably from 30 to 70%, by at least one metal ion selected from lithium, potassium, sodium, zinc, magnesium, aluminum, and calcium. For purposes of this invention the weight % of the acid component can be based either the acid or the partially neutralized ionomer form with essentially no practical significance or substantial difference.

Suitable preferred ethylene copolymers include ethylene/acrylic acid, ethylene/methacrylic acid (E/MAA), ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/ethyl vinyl ether, ethylene/methacrylic acid/butyl vinyl ether, ethylene/acrylic acid/methyl acrylate, ethylene/methacrylic acid/ethyl acrylate, ethylene/methacrylic acid/methyl methacrylate, ethylene/acrylic acid/n-butyl methacrylate, ethylene/methacrylic acid/ethyl vinyl ether and ethylene/acrylic acid/butyl vinyl ether. The most preferred ethylene copolymers for use in the compositions of the present invention are ethylene/methacrylic acid, ethylene/acrylic acid copolymers, ethylene/methacrylic acid/n-butyl acrylate and ethylene/methacrylic acid/methylacrylate terpolymers.

The composition of the present invention as described herein is based on 100% of the components (a) through (c). Of course, the compositions can include other ingredients as are customarily used in the conventional compounding of thermoplastics, provided that such other ingredients are no more than 100 parts by weight per 100 parts by weight of components (a) through (c). Examples of such other ingredients include carbon black, metal deactivators, glass fibers, graphite fibers, DuPont Kevlar® aramid fibers, glass spheres, plasticizers, lubricants, silica, titanium dioxide, pigments, clay, mica, and other mineral fillers, flame retardants, antioxidants, ultraviolet stabilizers, heat stabilizers, processing aids, adhesives, and tackifiers.

Applicants have discovered specific compositions and wire and cable coatings within those described above that are especially suitable for high temperature applications requiring chemical and flame resistance, and flexibility among other properties. The key to such compositions lies in the ratio of the weight of polymeric grafting agent to the weight of ethylene copolymer, as well as the relative amounts of such components. Particularly, applicants have identified that when the weight ratio of polymeric grafting agent (b) to ethylene copolymer (c) ranges from about 3:1 to about 20:1, the resulting polymer alloy demonstrates good flexural modulus, tensile strength, as well as improved elongation at break, and improved retention of elongation at break upon aging. As such, the weight ratio of the reactive comonomer of (b) to the acid-containing comonomer of (c) is preferably from 3 to 20.

More particularly, since the weight ratio of (b):(c) can be varied by altering the comonomer content of the respective polymers, applicants have also identified the optimum molar ratios of the first reactive moiety of the polymeric grafting agent (b) to acid moiety of the ethylene copolymer (c), which may be a better indicator of the preferred compositions. The molar ratio is calculated simply as the moles of reactive moiety in the grafting agent (b), e.g. GMA, divided by moles of acid moiety, e.g. MAA, in the ethylene copolymer (c). The optimum molar ratio of first reactive moiety of (b):acid of (c) ranges from about 1.0 to about 5.5, preferably about 1.0 to about 5.25, more preferably about 1.7 to about 4, and most preferably about 1.7 to about 1.9 (based on the examples showing ratios of 1.74, 1.83 and 1.88).

As-molded elongation at break (ELO) levels about 150 and higher are critical for wire and cable applications. Compositions, as described herein, having a weight ratio (b):(c) in the range of about 3:1 to about 20:1, or preferably having a molar ratio of first reactive moiety of (b):acid of (c) in the range of about 1.0 to about 5.5, also demonstrate excellent flame retardancy as demonstrated by the LOI, volume swell and electrical properties, which make them especially suited to wire and cable applications, though other applications requiring the same balance of properties are contemplated.

The preferred weight ratio of polymeric grafting agent (b): ethylene copolymer (c) in the compositions and wire and cable coatings ranges from about 4:1 to about 18:1, and more preferably about 5:1 to about 15:1. Moreover, the compositions preferably contain at least about 30 weight percent of (b) and (c) combined, and more preferably about 40 weight percent of (b) and (c) combined. An especially preferred composition wherein the weight ratio (b):(c) is about 5:1, and/or the molar ratio first reactive moiety of (b):acid of (c) is about 1.8, is as follows:

(a) 60% by weight PPS;

(b) 33.3% by weight polymeric grafting agent, e.g. EnBAGMA, 5.25 wt % GMA;

(c) 6.7% by weight ethylene copolymer, e.g. ionomer, 9.0 wt. % MAA.

The three components of the compositions and wire and cable coatings described herein are melt blended with each other under high shear. The components may first be combined with one another in a "salt and pepper" blend (i.e., a pellet blend of each of the ingredients), or they may be combined with one another via simultaneous or separate metering of the various components, or they may be divided and blended in one or more passes into one or more sections of mixing equipment such as an extruder, Banbury, Buss Kneader, or Farrell continuous mixer, or other mixing equipment. For example, an extruder with two or more feed zones into which one or more of the ingredients may be added sequentially can be used.

The order of addition does not have any effect on the high temperature properties described by this invention. High shear insures proper dispersion of all the components such as would be necessary to carry out the grafting reaction. In addition, sufficient mixing is essential to achieve the morphology, which is necessary in the compositions of the present invention. The morphology required for the compositions of the present invention is that the continuous phase must be the thermoplastic; i.e., component (a).

This invention also provides a process for making an ultra thin-coated wire with the wire and cable coating compositions described herein. The foregoing discussion of the preferred embodiments of such coating apply equally as well to the claimed process employing such coating. Typically the process involves heating a polymer alloy composition to form a polymer melt, such as those described herein, and extruding such polymer melt around a wire or cable to form a coated wire or cable. Various methods of heating and extruding will be known to those skilled in the art.

Preferably the wire is coated with standard extrusion equipment in combination with a crosshead set-up and wire handling and take-up equipment. Present automotive wires typically have a 16 mil (0.016 inch) coating of insulating material over stranded copper conductor and meet SAE J1128 specification. Ultra thin constructions specified in J1678 typically may be 8 or 10 mils (i.e., 0.008 or 0.010 inches) thick and are more challenging in terms of physical/mechanical requirements and wire line processing because of the thinner constructions.

Typically, the material to be coated is added to the feed throat of the extruder, melted by exposure to temperature and shearing action based on screw and rpm selection, and coated on to wire. Temperature/shear conditions are chosen to minimize potential material degradation but completely melt the material. Proper sizing of the die in the crosshead for the conductor diameter allows application of the desired coating thickness to the wire. The coated material is solidified with air and water cooling to provide a deformation-free thermoplastic wire coating. Special high-speed take-up equipment usually provides the finished-coated wire on a reel. Ultra thin constructions are tested to J1678 specifications, which involves durability sandpaper abrasion and pinch tests and mandrel bend aging among other requirements.

The metal core of the electrically conductive wire according to the instant invention can be essentially any continuous metal single or multi-stranded wire or cable as generally known in the art. Typically this will include but is not limited to such metals as copper; aluminum, silver, nickel, as well as silver, tin and nickel coated copper, and the like. Preferably for automotive applications a multi-stranded copper wire is employed.

It is further contemplated for purposes of this invention that PPS alloy polymeric coating according to the instant invention can be used in combination with other coating layers as generally known in the art to produce a multi-layer coated wire and that various additives an colorants can be employed as conventionally practiced in the art.

The following examples are presented to more fully demonstrate and further illustrate various individual aspects and features of the present invention including but not limited to both the compositions as well as a wire and cable coatings and the electrically conductive wire coated with thermoplastic alloys based on polyphenylene sulfide (PPS) and in particular the manufacture of ultra thin automotive wire meeting J1678 specifications. As such, the showings are intended to further illustrate the differences and advantages of the present invention but are not meant to be unduly limiting. In presenting the examples, parts and percentages are by weight unless indicated otherwise and temperatures are in degrees Celsius.

EXAMPLES

The polymer alloys made according to this invention are manufactured by melt blending the three primary components of a poly(phenylene sulfide) resin, a polymer grafting agent, and an ethylene copolymer along with other additives using a 30 mm twin screw extruder under the equipment conditions outlined in Table 1. A twin screw extruder provides the high shear and residence time in the melt state necessary to provide the mixing required to produce an acceptable alloy. Other mixing equipment designed for use with polymer melts that can provide a similar high shear mixing would also be capable of manufacturing the alloys for this invention. This includes but is not limited to Banbury mixers, Buss co-kneaders, and two-roll-mills.

The steps for manufacturing the wire coating described by this invention are as follows:

1) Tumble mix a pellet blend of the various polymer components along with any additives.

2) Melt blend the mixture from step 1 using a twin screw extruder or similar device.

3) Quench the polymer strand exiting the extruder in a cold water bath and pelletize the strand after drying.

4) Extrude the pelletized alloy formed in steps 2 and 3 in the molten state onto wire followed by quenching in a cold water bath.

Table 2 outlines the physical properties of the alloys described by this invention and contrasts these properties with unmodified PPS resin. Comparative Example A in Table 2 is 100% of a commercial PPS resin sold by Phillips Chemical Company as Ryton® PR09-60 and prepared according to steps 1 to 3 above. The specific ionomer used in Examples 1 through 6 is a terpolymer of 67.5 wt % ethylene, 23 wt % n-butyl acrylate, and 9 wt % methacrylic acid where the acid comonomer has been neutralized 51% forming the zinc salt. The ionomer used is a commercial product sold by DuPont as Surlyn® 9320. The grafting agent used in Examples 1 through 6 is a terpolymer of 71.75 wt % ethylene, 23 wt % n-butyl acrylate, and 5.25 wt % glycidyl methacrylate abbreviated as E/nBA/GMA-5.

Material properties were tested on injection molded samples having a thickness of 0.125 inches (0.32 cm). Notched izod impact strength, tensile properties, flexural modulus, limiting oxygen index (LOI) and electrical properties were all tested according to the appropriate ASTM standard as listed in Table 2. ELO at break was tested under ASTM D-1708 at 2.0 in/min (5.1 cm/min) testing speed. It can be seen from the properties presented in Table 2 that the alloys made according to this invention are well suited for use as a wire coating having improved impact strength and elongation at break while maintaining oil and flame resistance.

The improvement in impact strength increases the notched izod value from 0.3 ft lb/in (160 N-m/m) for Comparative Example A to 11.5 ft lb/in (614 N-m/m) for Example 1. Examples 1 and 2 both provide improved elongation at break over Comparative Example A, increasing this property from 30% to greater than 160%. Although this increase in elongation is accompanied by an increase in oil swell, a decrease in LOI, and a decrease in tensile strength, all three of these properties are still well above those necessary for an acceptable wire coating material.

The value of these alloys as wire-coating materials is further exemplified by comparing their physical properties to those typical of ethylene/vinyl acetate based wire and cable coatings. Comparative Example B in Table 2 (data originally presented in Table 2 of patent application WO98/58019, Arhart; incorporated herein by reference) outlines the properties for this flame-retardant grade of the ethylene/vinyl acetate copolymer wire coating. This comparative material provides an oil swell value of 103%, an LOI of 28, and a tensile strength of 1.4 kpsi (9.65 MPa). As can be seen by comparing this data with that of Examples 1 and 2, the current invention provides a wire and cable coating comparable in flame retardancy as measured by LOI, but far superior in oil swell resistance and tensile strength without cross-linking the thermoplastic component. Accordingly, Example 1 provides approximately 4 times the oil resistance and over 3 times the tensile strength of Comparative Example B.

The Table 2 data further indicates how the alloys described provide materials that are more flexible than the unmodified PPS (Comparative Example A) as measured by flexural modulus. The Example 1 data indicate that the flexural modulus of the alloy, measured as 801 MPa, provides a 74% reduction from the 3,105 MPa measured for Comparative Example A. Furthermore, the above mentioned properties for the Example 1 and 2 alloys come with little to no loss in heat deflection temperature (HDT) or electrical properties. For Example 1, HDT is lowered by only 4° C. from the value measured for the unmodified PPS resin.

Table 3 presents as molded physical properties for the alloys made according to this invention that vary in grafting agent to ionomer ratio. The compositions outlined in Table 3 show that Examples 3 to 6 are based on the preferred high flow/low viscosity PPS resin useful for wire coating applications (Ryton® GR02). One of the critical properties for a wire coating is the material's elongation at break. Higher values of elongation at break are beneficial as the coating material can then undergo large deformations before failure occurs.

The Table 3 data indicate that for the alloys described by this invention and based on 60 wt % PPS, a maximum in elongation at break is obtained using a grafting agent (E/nBA/GMA-5) to ethylene copolymer (ionomer) weight ratio of 5, or preferably a molar ratio of 1.74. This optimum ratio indicates a preferred alloy composition for this invention is described by Example 5.

The above examples indicate that the alloys described by this invention provide materials with a unique balance of properties well suited for use as wire and cable coatings. These alloys possess the inherent flame resistance, oil resistance, impact resistance, flexibility, and high temperature durability required for demanding wire and cable applications.

TABLE 1

Temperature Profile for 30 mm twin screw extruder

| Zone | 1 | 2 | 3 | 4 | 5 | 6 | 7 | 8 | Die | Melt |
|---|---|---|---|---|---|---|---|---|---|---|
| Temp (° C.) | 265 | 265 | 265 | 265 | 265 | 265 | 265 | 265 | 270 | 295–325 |

Extruder conditions: 150 rpm and 12 lb/hr production rate

TABLE 2

Physical Properties of Compositions

| | Comparative | | Examples | |
|---|---|---|---|---|
| | Comp. Ex. A | Example B | 1 | 2 |
| Designation | Ryton® PR09-60 | EVA/ATH† | PPS-60* | PPS-50* |
| Notched Izod Impact Strength (ft lb/in), ASTM D256 | | | | |
| As-molded | 0.3 | — | 11.5 | 10.5 |
| 2 hrs @ 200° C. | 0.3 | — | 9.8 | 9.2 |
| 7 days @ 204° C. | — | — | 4.1 | 4.0 |
| Notched Izod Impact Strength - above data expressed in (N-m/m) | | | | |
| As-molded | 16.0 | — | 614 | 560 |
| 2 hrs @ 200° C. | 16.0 | — | 523 | 491 |
| 7 days @204° C. | — | — | 219 | 214 |
| Flexural Modulus (MPa [kpsi]), ASTM D790 | | | | |
| As-molded | 3105 [450] | — | 801 [116] | 532 [77] |
| 2 hrs @ 200° C. | 3795 [550] | — | 938 [136] | 635 [92] |
| Tensile Strength (MPa [kpsi]), ASTM D1708 | | | | |
| As-molded | 62 [9.0] | 9.6 [1.4] | 33 [4.8] | 28 [4.0] |
| 2 hrs @ 200° C. | 86 [13] | — | 32 [4.6] | 25 [3.7] |
| Elongation at Break (%), ASTM D1708 | | | | |
| As-molded | 30 | 199 | 170 | 160 |
| 2 hrs @ 200° C. | 2.5 | — | 114 | 96 |
| 7 days @ 175° C. | — | 141 | — | — |
| % retained | 8.3 | 71 | 67 | 60 |
| HDT @ 264 psi (° C.), ASTM D648 | 77 | — | 73 | 70 |

TABLE 2-continued

Physical Properties of Compositions

|  | Comp. Ex. A | Comparative Example B | Examples 1 | Examples 2 |
|---|---|---|---|---|
| Shore D Hardness, ASTM D2240 | 82 | — | 67 | 60 |
| Limiting Oxygen Index (LOI), ASTM D2863 | 45 | 28 | 30 | 25 |
| % Volume Increase in IRM 903 oil @ 150° C. for 70 hrs, ASTM D471 | −1.9 | 103 | 27 | 45 |
| Dielectric Strength (V/mil), ASTM D149 | 430 | — | 447 | 456 |
| Dielectric Constant (1 KHz), ASTM D150 | 3.6 | — | 3.6 | 3.5 |
| Volume Resistivity (ohm-cm), ASTM D257 | 1.8E17 | — | 8.5E14 | 1.0E15 |

Notes:
*PPS-60 has 60 wt % PPS (Ryton ® PR09-60), 0.3 wt % Irganox 1010, and includes Surlyn 9320 in 1:3 ratio with E/nBA/GMA. PPS-50 has 50 wt % PPS (Ryton ® PR09-60), 0.3 wt % Irganox 1010, and includes Surlyn 9320 in 1:4 ratio with E/nBA/GMA.
†EVA/ATH is a cross-linked ethylene vinyl acetate (EVA) composition containing aluminum trihydrate (ATH) as a flame retardant. Original data and further details presented in WO98/58019 [Comparative example 1 in Table 2, Arhart].

TABLE 3

Effect of Grafting Co-Polymer:Ionomer Ratio in 60 wt % PPS alloys

|  | Examples 3 | 4 | 5 | 6 |
|---|---|---|---|---|
| Ryton ® GR02 (wt %) | 60.0 | 60.0 | 60.0 | 60.0 |
| Surlyn ® 9320 (wt %) | 0.0 | 2.5 | 6.7 | 10.0 |
| E/nBA/GMA-5 (wt %) | 39.7 | 37.2 | 33.0 | 29.7 |
| Irganox 1010 (wt %) | 0.3 | 0.3 | 0.3 | 0.3 |
| E/nBA/GMA:Ionomer wt ratio | — | 15:1 | 5:1 | 3:1 |
| GMA:acid mol ratio | — | 5.25 | 1.74 | 1.05 |
| Flexural Modulus (kpsi) | 40 | 111 | 107 | 105 |
| (MPa) | 276 | 765 | 738 | 724 |
| Tensile Strength (kpsi) | 2.0 | 4.0 | 4.2 | 4.2 |
| (MPa) | 13.8 | 27.5 | 29.0 | 29.0 |
| Elongation at Break (%) | 53 | 150 | 194 | 163 |
| Elongation at Break (%) After aging 21 days at 150° C. | 37 | 92 | 93 | 84 |
| % Retention | 70 | 60 | 50 | 50 |

Comparative Examples C–G

These were prepared as described above. The examples in Table 4 all used 60 weight percent Ryton® GR02 PPS and 0.3 wt % Irganox 1010 in the formulations. Table 4 shows Comparative Examples C–G which all demonstrated elongation to break of less than 150%. These compositions are typically less suitable for wire and cable applications.

TABLE 4

Compositions with Eb Below 150%

| Example (Elongation) | Content | GMA polymer to ionomer weight ratio | GMA monomer to acid (MAA) molar ratio |
|---|---|---|---|
| C (Eb = 58%) | 39.05% of E/nBA/GMA (5.25% GMA) 0.65% of Surlyn ® 9320 (9.00% MAA) | 60:1 | 21.2 |
| D (Eb = 116%) | 26.47% E/nBA/GMA-5 13.23% Surlyn ® 9320 | 2:1 | 0.709 |
| E (Eb = 87%) | 19.85% E/nBA/GMA-5 19.85% Surlyn ® 9320 | 1:1 | 0.354 |
| F (Eb = 16%) | 9.92% E/nBA/GMA-5 29.78% Surlyn ® 9320 | 1:3 | 0.118 |
| G (Eb = 19.4%) | 6.62% E/nBA/GMA-5 33.08% Surlyn ® 9320 | 1:5 | 0.0707 |

Examples 7–9 and Comparative Examples H–N

Comparison of Weight Ratios and Molar Ratios to Determine Optimum Compositions

TABLE 5

Comparison of Weight Ratios v. Molar Ratios of Components (b):(c)

| Example (Elongation) (MAA) | Content | GMA polymer to ionomer weight ratio | GMA to acid molar ratio |
|---|---|---|---|
| H (Eb = 82%) | 39.05% E/nBA/GMA (1.4% GMA) 0.65% Surlyn ® 9320 (9.0% MAA) | 60:1 | 5.66 |
| 7 (Eb = 196%) (optimum) | 37.81% E/nBA/GMA (1.4% GMA) 1.89% Surlyn ® 9320 (9.0% MAA) | 20:1 (optimum) | 1.88 |
| 8 (Eb = 185%) | 37.22% E/nBA/GMA (1.4% GMA) 2.48% Surlyn ® 9320 (9.0% MAA) | 15:1 | 1.41 |
| I (Eb = 74%) | 33.08% E/nBA/GMA (1.4% GMA) 6.62% Surlyn ® 9320 (9.0% MAA) | 5:1 | 0.471 |
| J (Eb = 59%) | 29.78% E/nBA/GMA (1.4% GMA) 9.92% Surlyn ® 9320 (9.0% MAA) | 3:1 | 0.283 |
| K (Eb = 46%) | 26.47% E/nBA/GMA(1.4% GMA) 13.23% Surlyn ® 9320 (9.0% MAA) | 2:1 | 0.188 |
| L (Eb = 21%) | 9.92% E/nBA/GMA (1.4% GMA) 29.78% Surlyn ® 9320 (9.0% MAA) | 1:3 | 0.0314 |
| 9 (Eb = 212%) (optimum) | 29.7% Lotader AX8840-E/GMA (analyzed by NMR as 9.2% GMA) 10.0% Surlyn ® 9320 (9.0% MAA) | 3:1 (optimum) | 1.83 |
| M (Eb = 96%) | 29.1% E/nBA/GMA (5.25% GMA) 10.6% Surlyn ® 9320 (9.0% MAA) | 2.74 | 0.969 |
| N (Eb = 58%) | 37.81% E/nBA/GMA (5.25% GMA) 1.89% Surlyn ® 9320 (9.0% MM) | 20.0 | 7.07 |

The examples in Table 5 all used 60 weight percent Ryton® GR02 PPS and 0.3 wt % Irganox 1010 stabilizer in the formulations. The examples shown in Table 5 were run as described above using 1.4% GMA containing polymer in the alloys, except for Example 9, which used a 9.2% GMA E/GMA polymer, and Examples M and N which used a 5.25% GMA containing polymer.

One can see from these examples and Example 5, that depending on the system of ethylene copolymers used, the optimum weight ratio of GMA-containing polymer to ionomer can vary substantially (3:1 in Example 9, 5:1 in Example 5, and 20:1 in Example 7). These optimum compositions provide a polymer alloy with elongation at break around the 200% level, which is excellent for wire and cable applications. It seems that the molar ratio of GMA-containing polymer to ionomer is more consistent in these examples, never straying from the range of 1.7 to 1.9, and thus a better predictor of the optimum compositions.

Examples 10–14

Additional GMA:MAA Molar Ratios Tested

The following compounds are all based on Ryton® GR02 PPS, the same PPS used in the earlier examples, and were prepared and tested as described above. Each compound contained 60 wt % GR02 and 0.3 wt % Irganox 1010 stabilizer, and only varied in the ratio of EnBAGMA-5 to ionomer content. Elongation at break was measured for each.

| Example | GMA:MAA molar ratio | Elongation at Break (%) |
|---------|---------------------|--------------------------|
| 10 | 2.0 | 160 |
| 11 | 2.5 | 180 |
| 12 | 3.0 | 170 |
| 13 | 4.0 | 170 |
| 14 | 5.0 | 140 |

The data from the above examples have been plotted in FIG. 1.

As the data show, the GMA:MAA ratio is a key parameter for maximizing elongation at break for the alloys, which use the GR02 resin as the base. Elongation at break is a critical parameter for wire and cable compounds, with certain specifications requiring a minimum of 150%. The data indicate a broad range of about 1.0 to about 5.5 is preferable for GMA:MAA ratio; i.e., the molar ratio of the reactive comonomer of (b) to the acid-containing comonomer of (c) is preferably from 1.0 to 5.5.

Examples 15–18

Ultra Thin J 1678 Wire

A series of four additional wire coating compositions based on Ryton® GR02 (PPS), Ryton® M2588 (PPS), and a mixture thereof were prepared in a manner analogous to the previous examples. Each composition further consisted of 1.2% Irganox 1010 stabilizer, and varying amounts of E/nBA/GMA-5 and Surlyn® 9320 in the formulations as set forth in the following Table 6.

TABLE 6

Ultra Thin J 1678 Wire

| | Examples | | | |
|---|---|---|---|---|
| | 15 | 16 | 17 | 18 |
| Ryton ® GR02 (wt %) | 69.0 | 32.5 | 0.0 | 60.0 |
| Ryton ® M2588 (wt %) | 0.0 | 32.5 | 60.0 | 0.0 |
| E/nBA/GMA-5 (wt %) | 24.83 | 28.2 | 32.3 | 32.3 |
| Surlyn ® 9320 (wt %) | 4.97 | 5.6 | 6.5 | 6.5 |
| Irganox 1010 (wt %) | 1.2 | 1.2 | 1.2 | 1.2 |

All materials were compounded on a 30 mm twin-screw extruder as previous described using the same temperature/condition profile as described in Table 1. The general steps in the process of making/coating the composition onto wire are as described above in the Experimental section. Each of these compositions was extruded onto 22A WG 7 strand copper conductor wire at a coating thickness of 8 mils (0.008 inch) at extruder rpm speed of 30 to 90 and line rates of 1,000 to 1,600 feet per minute in a 45 mm extruder using a gradual transition metering screw with L/D=30 and a pressure die set up. The extruder temperature profile varied from 525° F. (274° C.) at the feed to 600° F. (315° C.) at the die with melt temperature varying from 555° F. (290° C.) to 590° F. (310° C.). The coated wire was cooled in water and taken up with high-speed wire line reel take up. All of the compositions and coated wire met the J 1678 specification standard at 125° C. for automotive wire used under the hood. Composition and coated wire of example 17 met the J 1678 specification at 150° C. for automotive primary wire.

Examples 19–20 and Comparative Example M

High Temperature Appliance Wire

In a manner analogous to previous examples, three selected formulations reflecting those of previous Examples 1 and 2 and Comparative F are compounded in a twin screw extruder and ⅛ inch thick test plaques (Tensile Strength) and bars (Izod Impact) are injection molded using a mold temperature of 30° C. Testing is performed as per appropriate ASTM standard and heat aging is performed in circulating air oven held at 200° C. (2 hours and 7 days). The resulting data is presented below.

| Example (in wt %) | Tensile Elongation at Break | | Notched Izod (ft lb/in) | | |
|---|---|---|---|---|---|
| | as molded | 2 hrs @ 200° C. | as molded | 2 hrs | 7 days |
| M) 59.7% Ryton ® PR09<br>30.0% Surlyn ® 9320<br>10.0% EnBAGMA-5<br>0.3% Irganox 1010 | 13% | 16% | 0.55 | 0.65 | 0.59 |
| 19) 59.7% Ryton ® PR09<br>10.0% Surlyn ® 9320<br>30.0% EnBAGMA-5<br>0.3% Irganox 1010 | 166% | 114% | 11.5 | 9.8 | 4.1 |
| 20) 49.7% Ryton ® PR09<br>10.0% Surlyn ® 9320<br>40.0% EnBAGMA-5<br>0.3% Irganox 1010 | 160% | 96% | 10.5 | 9.2 | 4.0 |

When the above PPS alloy compositions are coated on stranded copper wire at nominal thickness of from about 15 to 30 mils making electrically conductive appliance wire, the respective wire coated with the compositions of example 19 and 20 exhibit improved ability to withstand high temperature relative to the wire of comparative example M.

Having thus described and exemplified the invention with a certain degree of particularity, it should be appreciated that the following claims are not to be so limited but are to be afforded a scope commensurate with the wording of each element of the claim and equivalents thereof.

We claim:

1. A process for coating a wire or cable with a partially grafted polymer composition comprising the steps of:

(I) heating the partially grafted polymer composition to form a polymer melt; and (II) extruding the partially grafted polymer melt around a wire or cable to form a coated wire or cable, wherein the partially grafted polymer composition comprises:

(a) from 40% to 90% by weight polyphenylene sulfide;

(b) from 9% to 50% by weight of a polymeric grafting agent, said grafting agent comprising a copolymer wherein for every one hundred parts by weight copolymer (i) at least 50 parts by weight are derived from ethylene comonomer; (ii) from 0.5 to 15 parts by weight are derived from one or more reactive comonomer selected from the group consisting of an unsaturated epoxide of 4 to 11 carbon atoms; an unsaturated isocyanate of 2 to 11 carbon atoms; an unsaturated alkoxy silane and unsaturated alkyl silane, wherein the alkoxy and the alkyl group is from 1 to 12 carbon atoms; and an unsaturated oxazoline; and (iii) from 0 to 49 parts by weight are derived from an optional third comonomer selected from the group consisting of an alkyl acrylate, alkyl methacrylate, vinyl ether, carbon monoxide, and sulfur dioxide, where the alkyl and ether groups are of 1 to 12 carbon atoms; and (c) from 1% to 20% by weight of an ethylene copolymer, wherein for every one hundred parts by weight ethylene copolymer (i) at least 50 parts by weight are derived from ethylene comonomer, (ii) from 1 to 35 parts by weight are derived from an acid-containing unsaturated carboxylic acid or anhydride comonomer, and (iii) from 0 to 49 parts by weight are derived from a comonomer selected from the group consisting of alkyl acrylate, alkyl methacrylate, vinyl ether, carbon monoxide, and sulfur dioxide, and further wherein the acid groups are neutralized from 0 to 100% by a metal ion.

2. The process of claim 1 wherein the molar ratio of said reactive comonomer of (b) to acid-containing comonomer of (c) is from 1.0 to 5.5.

3. The process of claim 1 wherein the combined weight of polymeric grafting agent (b) and ethylene copolymer (c) is greater than 30 weight percent, and the molar ratio of said reactive comonomer of (b) to acid-containing comonomer of (c) is from 1.0 to 5.5.

4. The process of claim 3 wherein polymeric grafting agent (b) is a terpolymer of ethylene/n-butyl acrylate/glycidyl methacrylate and ethylene copolymer (c) is an ionomer.

5. An electrically conductive wire comprising a metal core and an outer electrically insulating, partially grafted polymer coating; wherein said partially grafted polymer coating comprises:

(a) from 40% to 90% by weight polyphenylene sulfide;
(b) from 9% to 50% by weight of a polymeric grafting agent, said grafting agent comprising a copolymer wherein for every one hundred parts by weight copolymer (i) at least 50 parts by weight are derived from ethylene comonomer; (ii) from 0.5 to 15 parts by weight are derived from one or more reactive comonomer selected from the group consisting of an unsaturated epoxide of 4 to 11 carbon atoms; an unsaturated isocyanate of 2 to 11 carbon atoms; an unsaturated alkoxy silane and unsaturated alkyl silane, wherein the alkoxy and the alkyl group is from 1 to 12 carbon atoms; and an unsaturated oxazoline; and (iii) from 0 to 49 parts by weight are derived from an optional third comonomer selected from the group consisting of an alkyl acrylate, alkyl methacrylate, vinyl ether, carbon monoxide, and sulfur dioxide, where the alkyl and ether groups are of 1 to 12 carbon atoms; and
(c) from 1% to 20% by weight of an ethylene copolymer, wherein for every one hundred parts by weight ethylene copolymer (i) at least 50 parts by weight are derived from ethylene comonomer, (ii) from 1 to 35 parts by weight are derived from an acid-containing unsaturated carboxylic acid or anhydride comonomer, and (iii) from 0 to 49 parts by weight are derived from a comonomer selected from the group consisting of alkyl acrylate, alkyl methacrylate, vinyl ether, carbon monoxide, and sulfur dioxide, and further wherein the acid groups are neutralized from 0 to 100% by a metal ion, wherein said wire withstands temperatures as high as 150° C.

6. An electrically conductive wire of claim 5 wherein the molar ratio of said reactive comonomer of (b) to said acid-containing comonomer of (c) is from 1.0 to 5.5.

7. An electrically conductive wire of claim 6 wherein the weight ratio of said reactive comonomer of (b) to said acid-containing comonomer of (c) is from 3 to 20.

8. An electrically conductive wire of claim 5 wherein the molar ratio of said reactive comonomer of (b) to acid-containing comonomer of (c) is from 1.7 to 4, and said polymeric grafting agent (b) is a terpolymer of ethylene/n-butyl acrylate/glycidyl methacrylate and said ethylene copolymer (c) is an ionomer.

9. An electrically conductive wire of claim 8 wherein the weight ratio of said reactive comonomer of (b) to said acid-containing comonomer of (c) is from 3 to about 20.

10. An electrically conductive wire of claim 5 wherein the combined weight of said polymeric grafting agent (b) and said ethylene copolymer (c) is greater than about 30 weight percent of said polymer coating, and the molar ratio of said reactive comonomer of (b) to said acid-containing comonomer of (c) is from 1.0 to 5.5.

11. An electrically conductive wire of claim 5 wherein the combined weight of said polymeric grafting agent (b) and said ethylene copolymer (c) is greater than about 30 weight percent of said polymer coating, the molar ratio of said reactive comonomer of (b) to said acid-containing comonomer of (c) is from 1.7 to 4, and said polymeric grafting agent (b) is a terpolymer of ethylene/n-butyl acrylate/glycidyl methacrylate and said ethylene copolymer (c) is an ionomer.

12. An electrically conductive wire of claim 5 wherein the combined weight of said polymeric grafting agent (b) and said ethylene copolymer (c) is greater than 30 weight percent of said polymer coating, and the molar ratio of said reactive comonomer of (b) to said acid-containing comonomer of (c) is from 1.0 to 5.5, and the weight ratio of said reactive comonomer of (b) to said acid-containing comonomer of (c) is from 3 to 20.

13. An electrically conductive wire of claim 5 wherein the combined weight of said polymeric grafting agent (b) and said ethylene copolymer (c) is at least 40% by weight of said polymer coating and the molar ratio of said reactive comonomer of (b) to said acid-containing comonomer of (c) is from 1.0 to 5.5.

14. An electrically conductive wire of claim 13 wherein the molar ratio of said reactive comonomer of (b) to said acid-containing comonomer of (c) is from 1.7 to 4, and said polymeric grafting agent (b) is a terpolymer of ethylene/n-butyl acrylate/glycidyl methacrylate and said ethylene copolymer (c) is an ionomer.

15. An electrically conductive wire of claim 13 wherein the weight ratio of said reactive comonomer of (b) to said acid-containing comonomer of (c) is from 3 to 20.

16. An electrically conductive wire of any one of claims 5, 6 or 10 wherein said polymeric grafting agent (b) is a terpolymer of ethylene/n-butyl acrylate/glycidyl methacrylate and said ethylene copolymer (c) is an ionomer.

17. An electrically conductive wire of any one of claims 5–15 wherein the thickness of said polymer coating is in the range of from 15 mils to 30 mils.

18. An electrically conductive wire of claim 16 wherein the thickness of said polymer coating is in the range of from 15 mils to 30 mils.

* * * * *